United States Patent [19]

Zylstra

[11] Patent Number: 4,897,756
[45] Date of Patent: Jan. 30, 1990

[54] ADD-ON GROUND FAULT MODULE

[75] Inventor: Henry J. Zylstra, Alburnette, Iowa

[73] Assignee: Square D Company, Palatine, Ill.

[21] Appl. No.: 314,288

[22] Filed: Feb. 22, 1989

Related U.S. Application Data

[63] Continuation of Ser. No. 9,418, Jan. 30, 1987, abandoned.

[51] Int. Cl.$^4$ .............................................. H02H 3/16
[52] U.S. Cl. ...................................... 361/44; 361/47; 361/58; 361/95; 361/97
[58] Field of Search ....................... 361/42, 58, 44–47, 361/89, 94, 95, 97, 98

[56] References Cited

U.S. PATENT DOCUMENTS

| 3,809,962 | 5/1974 | Brown et al. | 361/44 |
| 4,258,403 | 3/1981 | Shimp | 361/44 X |
| 4,316,229 | 2/1982 | Helwig | 361/45 X |
| 4,380,785 | 4/1983 | Demeyer et al. | 361/44 X |
| 4,706,155 | 11/1987 | Durivage et al. | 361/68 X |

Primary Examiner—Todd E. Deboer
Attorney, Agent, or Firm—Mary R. Jankousky; Thomas B. Lindgren; Jose W. Jimenez

[57] ABSTRACT

An add on ground fault detection system including a module readily connected to the distribution line and to the associated circuit breaker, and including circuit means for sensing a metering signal while providing a low resistance burden to summing transformers, and providing a relay tripping signal if the metering signal is above a selected level.

11 Claims, 2 Drawing Sheets

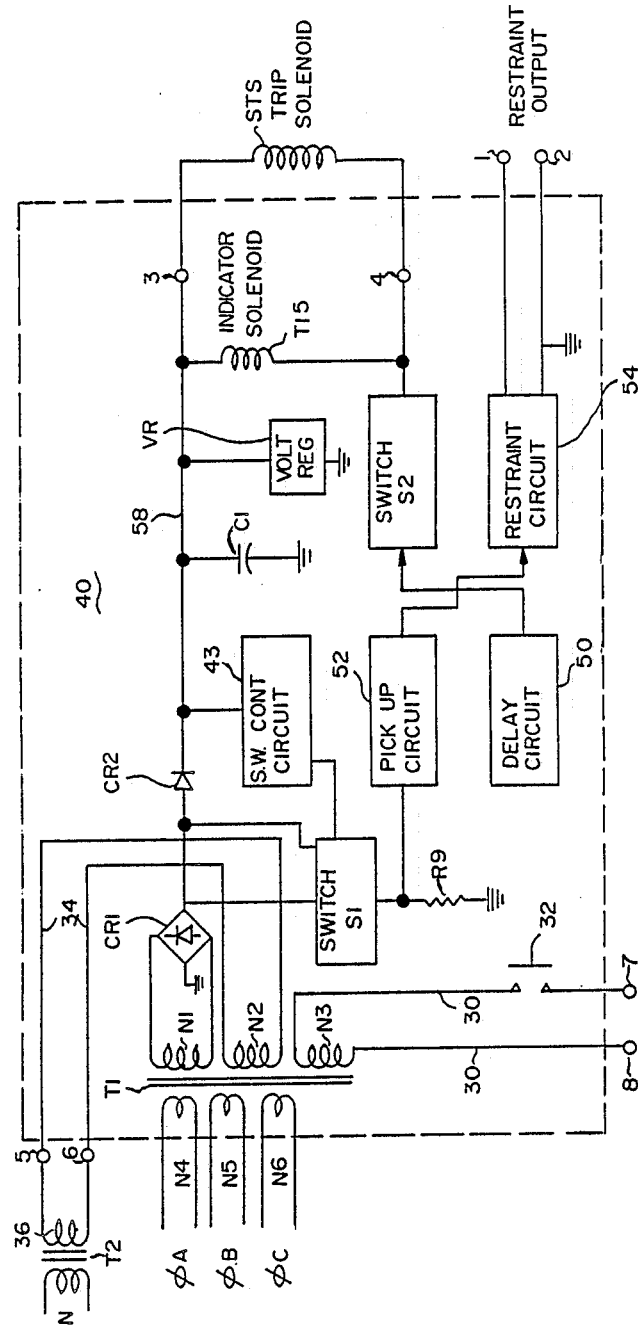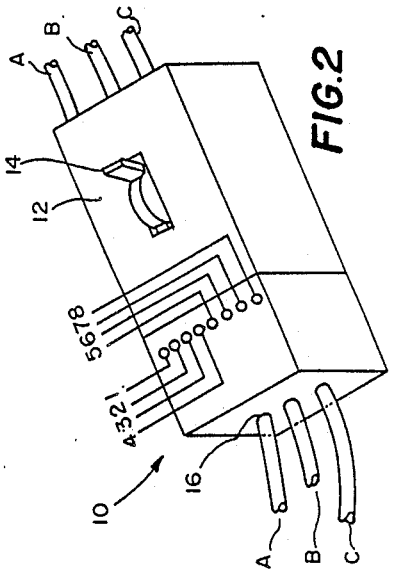
FIG.1
FIG.2

ADD-ON GROUND FAULT MODULE

DESCRIPTION

This application is a continuation of application Ser. No. 009,418 filed Jan 30, 1987, now abandoned.

1. Technical Field

The present invention relates generally to overcurrent protection devices and, more particularly, to a ground fault module that is particularly adapted for connection to a circuit breaker to enable it to automatically trip when a ground fault current is detected.

2. Background Prior Art

Ground fault conditions result in an imbalance or inequality in currents flowing from a source to and from a load. One manner of detecting this imbalance in the past has been to utilize a transformer having an opening or "window" through which the conductors of the circuit are passed with a relay connected to the transformer that is activated to interrupt the circuit whenever a ground fault condition occurs.

Various alternate types of approaches of detecting ground faults have been proposed, including the interconnection of the secondary windings of the phase current transformers into a summing circuit which will result in a zero output when there is no ground fault condition present. However, if the summation of the secondary circuits is not zero, a ground fault condition exists and various solid state circuitry has been proposed for utilizing the ground fault condition as a tripping signal for relay activated circuit breakers.

Industrial circuit breakers which respond to overcurrent conditions ranging from overload to short-circuit are common and have many applications. Many of these breakers also incorporate sensing devices to sense a ground fault condition and to activate the circuit breaker when such ground fault conditions occur.

SUMMARY OF THE INVENTION

According to the present invention, an add-on ground fault detection system has been developed which can be connected directly to the inputs of a conventional shunt trip operated circuit breaker. The ground fault detection system consists of, a main transformer that has primary windings connected directly to conductors leading to the associated circuit breaker and at least one secondary winding to detect any imbalance in the primary windings and to produce an output if the sum of the inputs is not zero. The output is then processed through electronic circuitry and becomes the power source for activating a shunt trip solenoid of the circuit breaker.

The system is also designed for use in four-wire electrical systems using a separate transformer for the fourth or neutral wire, the output of which is connected to a secondary winding and summed with the main transformer outputs. A third secondary winding of the transformer provides a test function whereby a test voltage can be applied which results in current flow simulating a ground fault to effect an imbalanced current condition in the primary conductors.

More specifically, one embodiment of the ground fault detection system of the present invention includes a summing transformer having three primary windings and three secondary windings with an associated electrical circuit. One of the secondary windings detects an imbalance in the current in the three primary windings. An electronic circuit is connected to the one secondary winding and provides an output when the one secondary winding detects an imbalance in the circuit in the three primary windings. The electronic circuit includes a switch-controlled circuit which selectively turns "ON" and "OFF" to periodically place a relatively low resistance burden on the summing transformer to measure the net circuit current flow. The electronic circuit also includes a voltage regulator for assuring the voltage is at a preselected level prior to measurement of the current flow from the summing transformer. If the current flow in the summing transformer exceeds a certain level for a preselected time period, the current flow is utilized for energizing a solenoid that activates the shunt trip in the circuit breaker.

The electronic circuit may also include a pick-up circuit for initiating a signal to provide a tripping signal to the timedelay circuit which thereafter provides tripping energy to the solenoid. The control circuit may also include a restraining circuit for providing a signal to the circuit breakers that are located upstream of the ground fault detection system to isolate the circuit breaker associated with the ground fault detection system.

The ground fault detection system is also designed to be utilized with a three-phase electrical system with or without a neutral conductor. In the case of a system having a neutral conductor, a separate transformer is provided for the neutral conductor, and the neutral conductor is electrically connected to one of the secondary windings of the summing transformer. Any current flow in the neutral conductor will be transmitted to a secondary winding of the summing transformer, which will in turn be detected by the secondary winding associated with the control circuit.

The control circuit means may also include a test switch means associated with one of the secondary windings of the summing transformer so that an associated voltage source may be applied to the transformer to create an imbalance condition in the primary windings and simulate a ground fault condition.

BRIEF DESCRIPTION OF SEVERAL VIEWS OF DRAWINGS

FIG. 1 is a schematic illustration in block form of the electronic circuit forming part of the ground fault detection system.

FIG. 2 is a perspective view of the add-on ground fault module and an associated circuit breaker.

DETAILED DESCRIPTION

Figure 3:
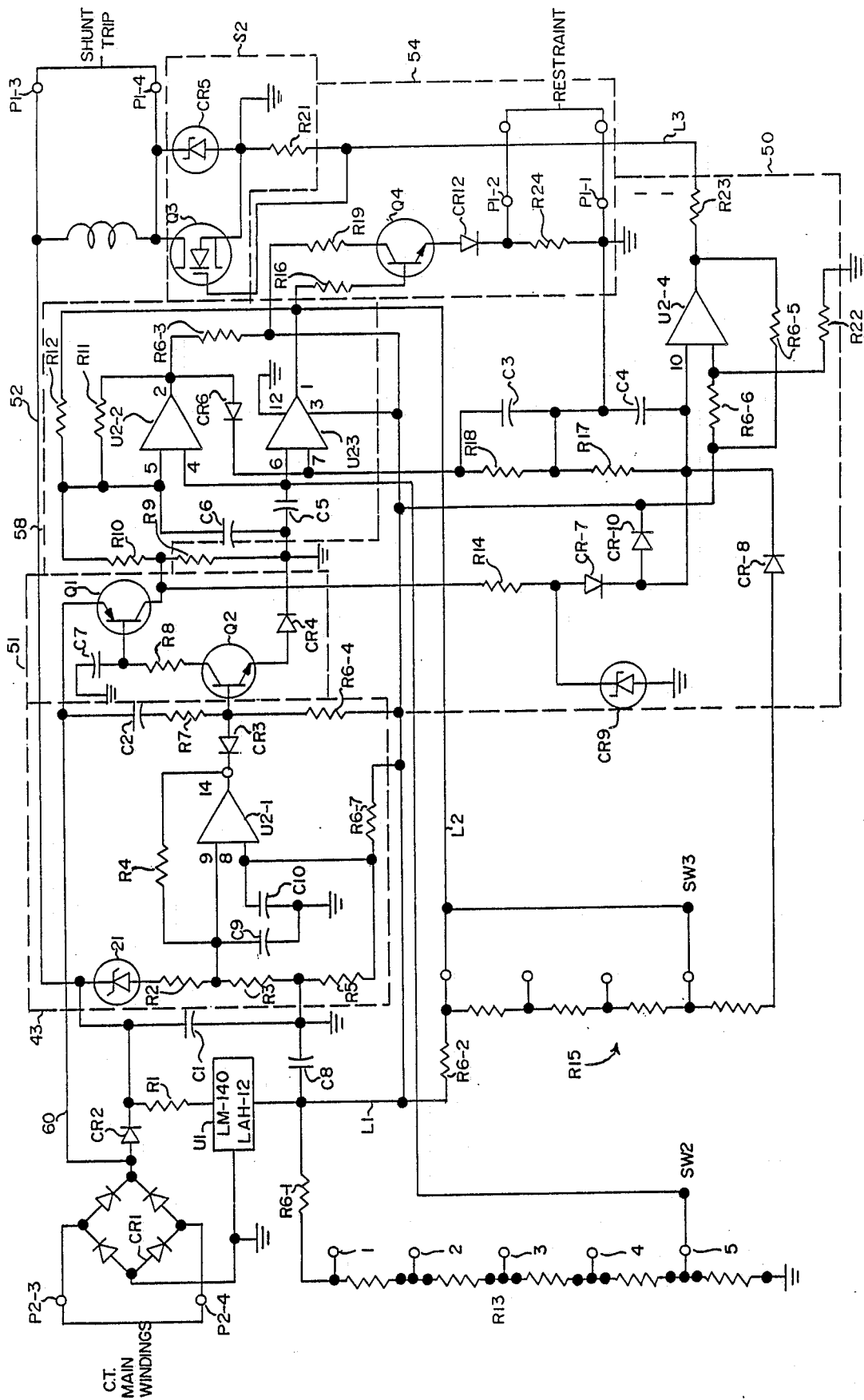
FIG. 3 is a detailed schematic diagram of the ground fault electronic circuit.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Referring to FIG. 2, an add-on ground fault module, designated by reference numeral 10, is interconnected with a conventional shunt trip operated circuit breaker 12 that incorporates a shunt trip solenoid for interrupting the circuit breaker in the event of an overload condition. The circuit breaker 12 may be of the type sold by the Square D Company and includes a manual switch 14 in addition to the shunt trip solenoid (not shown) for interrupting the circuit. As is conventional, the circuit breaker normally has three conductors A, B and C connected to the OFF side through input sockets (not shown) of the circuit breaker.

According to one aspect of the present invention, the add-on module 10 incorporates standard lugs (not shown) that are received into the input sockets of the circuit breaker and the module 10 has three input terminals 16 for receiving the respective conductors A, B and C of a three-phase electrical system. The module 10 has a plurality of connector terminals labeled by numbers 1–8 in FIG. 2 which are connected to the circuit illustrated in FIG. 1.

An electronic circuit incorporated in the ground fault module 10 is illustrated schematically in FIG. 1. The circuit includes a transformer T1 having primary windings N4, N5, N6 for connection to the three A-C power lines A, B and C. Transformer T1 also has three secondary windings N1, N2 and N3.

Secondary winding N3 is connected through conductors 30 and a switch 32 to external terminals 7 and 8 of module 10 to provide a test function, as will be described later. The secondary winding N2 is connectable by conductors 34 through terminals 5 and 6 of module 10 to the secondary winding 36 of a neutral transformer T2. Transformer T2 has its primary windings N connected to a neutral conductor (not shown). The first secondary winding N1 is utilized as a detector for detecting a ground fault condition in any one of the primary windings N4, N5 and N6 or neutral winding N.

Secondary winding N1 is connected through a full-wave bridge rectifier CR1 to the electronic circuitry, generally indicated by reference numeral 40. The electronic circuitry 40 includes a voltage regulator VR, a switch control circuit 43, first and second switches and associated circuits S1 and S2, a capacitor C1, a delay circuit 50, a pick-up circuit 52, and a restraint output circuit 54. The foregoing circuitry is coupled between the bridge CR1 and a shunt trip solenoid STS that is part of the circuit breaker 12. The rectifier bridge CR1 is also connected to the trip solenoid STS through a diode CR2 and conductor 58.

The various components and functional embodiments of the control circuit 40 are illustrated in more detail in FIG. 3. In FIG. 3, the output from the full wave rectifier bridge CR1 is coupled through diode CR2 to the switch control circuit 43. Diode CR2 also connects through resistor R1 to voltage regulator component U1 and through lead L1 to various other components, as will be explained.

A capacitor C1 is connected across the input of switch control circuit 43. The input from rectifier CR1 is impressed across capacitor C1 and is also applied across zener diode 21 and series connected resistors R2 and R3 of control circuit 43. The cathode of zener diode 21 is connected to lead 58 and its anode is connected through series resistors R2, R3, R5 and R6-7 to lead L1. The junction of resistors R2 and R3 is connected to the non-inverting input terminal 9 of comparator U2-1 of switch control circuit 43 and the junction of resistors R5 and R6-7 is connected to the inverting input terminal 8 of comparator U2-1. A reference voltage is coupled from voltage regulator U1 to the comparator U2-1 through resistor R6-7.

The output of the comparator U2-1 is connected through reverse connected diode CR3 to the base of an NPN transistor Q2 which forms part of the first switch S1. Switch S1 comprises transistor Q2 which drives a PNP transistor Q1. The emitter of the transistor Q1 is connected through lead 60 to the output of the bridge CR1, for purposes to be described later. The collector of transistor Q1 is coupled to the junction of resistor R9 and R10.

The pick-up circuit 52, is coupled between switches S1 and S2 and is also connected between the switch S1 and the restraint output circuit 54. Comparator U2-2 of pick-up circuit 52 has its output connected through a diode CR6 to the inverting input 7 of a second comparator U2-3. The restraint output circuit 54 receives an enabling signal from comparator U2-3 and provides an output restraint signal through an NPN transistor Q4, as will be described.

Capacitor C4 and comparator U2-4 form a part of time delay circuit 50, as will be described.

In the circuit of FIG. 3, approximately five volts is applied from voltage regulator U1 to the junction of resistors R5 and R6-7 and hence to inverting terminal 8 of the comparator U2-1. Assume the condition that the capacitor C1 is charging. In this condition, a low voltage is applied to the non-inverting input 9 of the comparator U2-1, and the output of comparator U2-1 is low. As the capacitor C1 charges, the voltage to the non-inverting input 9 of the comparator U2-1 exceeds the reference voltage at the inverting input 8 and the output of comparator U2-1 changes from a low output to a high output. This occurs when the voltage charge on the capacitor C1 reaches a predetermined level of about 48 volts.

As a result of the comparator U2-1 changing state, the transistor Q2 of the switch S1 changes from a non-conducting to a conducting state and this causes transistor Q1 of switch S1 to change from a non-conducting to a conducting state. When transistor Q1 conducts, a very low resistance burden is placed on the summing transformer T1 through the lead 60. During the time the transistor Q1 is conducting, the summing transformer T1 accurately measures the net current flow. The current from the secondary winding N1 flows through transistor Q1 and resistor R9 as an input to the relay pick-up circuit 52. The resulting voltage developed across resistor R9 is coupled to the non-inverting input 5 of comparator U2-2. Capacitor C6 in conjunction with resistor R10 act as an electrical filter for high frequency noise. During this time when the circuit is metering the current, the power is supplied to the circuit by the storage capacitor C1. When the capacitor C1 discharges to a lower voltage of about 44 volts, the comparator U2-1 changes states, and this will cause transistor Q1 to change from a conductive to a non-conducting state. This will again allow the capacitor C1 to recharge to its maximum voltage of 48 volts.

Note that the operation of the voltage regulator including U1, resistor R1 and capacitor C8 is such that its output reaches the regulated voltage prior to the change in state of comparator U2-1 and transistors Q1 and Q2.

When the value of the metering signal voltage appearing at the non-inverting terminal 5 of the comparator U2-2 of pick-up circuit 52 exceeds the reference voltage appearing at inverting input terminal 4 of comparator U2-2, the output of the comparator U2-2 changes from a low to a high output. This results in charging of the capacitor C3 of pick up. Capacitor C3 is charged through diode CR6. Capacitor C3 is also connected to the inverting input of comparator U2-3 of pick-up circuit 52, and when capacitor C3 charges, it causes comparator U2-3 to change from a low to a high output. A high output from the comparator U2-3 causes NPN transistor Q4 to conduct to provide a restraint signal to an upstream circuit breaker. If the pick-up output from the comparator U2-3 remains high, the circuit will provide tripping energy to the tripping solenoid STS at the end of the time delay as will now be explained.

When pick-up occurs, capacitor C4 of the time delay circuit 50 is allowed to charge through resistor R6-2 and the series resistors R15 and diode CR8. Capacitor C4 also receives a component of charge from the fault current appearing across resistor R9. This charge flows through resistor R14 and diode CR7. This second current path reduces the time delay as fault current increases. Diode CR9 limits the contribution from resistor R9 at very high fault levels. The time delay is also varied by adjusting the value of resistor R15. If the pick-up signal remains high, capacitor C4 will charge to the reference voltage which is impressed on non-inverting terminal pin 10 of comparator U2-4 to provide an output to switch S2. This positive output signal from the comparator U2-4 is applied through resistor R23 and lead L3 to the gate of the FET Q3 causing it to change from a non-conducting to a conducting state. This will allow the capacitor C1 to discharge through the tripping solenoid STS and the tripping indicator solenoid TIS resulting in the tripping of the circuit breaker and an indication of the tripping event.

When the output of the comparator U2-2 goes from a low to a high voltage level, it causes a change in the output of comparator U2-3 which in turn causes transistor Q4 to conduct. This develops a five-volt signal across the resistor R24 of restraint circuit 54. The output of the restraint circuit 54 will thus provide a reference voltage signal to an upstream breaker whenever a ground fault is detected and the pick-up is exceeded.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

I claim:

1. A ground fault detection system, comprising:
    a summing transformer having three primary turns through which associated currents pass, and first and second secondary windings, said primary turns being connectable to an associated electrical circuit breaker;
    said second secondary winding being selectively connectable to an AC test power source;
    a switch for connecting said AC test power source to said first secondary winding;
    an electronic circuit connected to said first secondary winding, said electronic circuit sensing the current output of said primary turns and said second secondary winding to provide an output proportional to the net current flow in said primary turns and said second secondary winding, said electronic circuit including;
    capacitor means chargeable to a preselected voltage level;
    a relatively low resistance burden;
    first switch means coupling said burden to said transformer only when said capacitor means is charged to said preselected voltage level;
    means for measuring said net current flow in said transformer;
    means for developing a metering voltage representative of said net current flow;
    a relay pick-up circuit for detecting said metering voltage;
    said capacitor means providing the power of said electronic circuit during the time the circuit is metering said net current flow and thereby discharging;
    said pick-up circuit being energizable in response to a metering signal above a selected reference level;
    a time delay means for providing a preset time delay and actuatable in response to a signal from said pick-up circuit;
    a tripping relay; and
    second switch means actuated by said pick-up signal circuit for discharging said capacitor through said tripping relay.

2. A ground fault detection system as in claim 1 further including a restraint circuit operable in response to said metering signal above said selected reference level to provide a fault indicating signal to an upstream circuit breaker.

3. A fault-powered ground fault interrupter system for supplying energy to a circuit breaker trip solenoid comprising:
    current transformer means including a secondary winding for developing a signal indicative of ground current flow;
    rectifying means coupled to said secondary winding for developing a DC voltage by rectification of said signal;
    a capacitor coupled to said rectifying means;
    measurement means for developing a trip signal in response to a ground fault current;
    switch means coupled to said capacitor for delivering operating current to a trip solenoid responsive to said trip signal; and
    means for selectively switching DC voltage from said rectifying means between said capacitor and said measurement means said capacitor supplies DC operating voltage to said measurement means.

4. The ground fault interrupter of claim 3 wherein said current transformer means includes three primary phase windings coupled to said secondary winding and a neutral current transformer electrically coupled to said secondary winding.

5. The ground fault interrupter of claim 4 further including:
    voltage regulating means coupled to said capacitor for regulating said DC operating voltage; and
    control means, in series with said voltage regulating means, for operating said selective switching means to couple said capacitor to said rectifying means when the voltage across said capacitor decreases to a predetermined level.

6. The ground fault interrupter of claim 5, wherein said measurement means includes;

pick-up circuit means detecting said ground fault current; and charging means coupled to said pick-up circuit means for integrating the output of said pick-up circuit means and operating said switch means for completing a discharge path for said capacitor through said trip solenoid.

7. The ground fault interrupter of claim 6, further including a restraint circuit coupled to said pick-up circuit means for developing a signal indicating detection of said ground fault current.

8. A fault-powered ground fault interrupter system for supplying energy to a circuit breaker trip solenoid comprising:

current transformer means including a secondary winding for developing a signal indicative of ground current flow;

rectifying means coupled to said secondary winding for developing a DC voltage by rectification of said signal; measurement means for developing a trip signal in response to a ground fault current;

a capacitor coupled to said rectifying means for developing DC operating voltage for said measurement means voltage regulating means coupled to said capacitor for regulating said DC operating voltage;

switch means coupled to said capacitor for delivering operating current to trip solenoid;

means for selectively switching said DC voltage from said rectifying means between said capacitor and said measurement means; and control means, in series with said voltage regulating means, for operating said selective switching means to couple said capacitor to said rectifying means when the voltage across said capacitor decreases to a predetermined level.

9. The ground fault interrupter of claim 8 wherein said measurement means include:

pick-up circuit means detecting said ground fault current; and charging means coupled to said pick-up circuit means for integrating the output of said pick-up circuit means and operating said switch means for completing a discharge path for said capacitor through said trip solenoid.

10. The ground fault interrupter of claim 9, further including a restraint circuit coupled to said pick-up circuit means for developing a signal indicating detection of said ground fault current.

11. The ground fault interrupter of claim 9 wherein said current transformer means includes three primary phase windings coupled to said secondary winding and a neutral current transformer electrically coupled to said secondary winding.

* * * * *